United States Patent [19]

Andersson et al.

[11] 4,133,972

[45] Jan. 9, 1979

[54] VACUUM CLEANER HOSE HAVING AN ELECTRICAL CONDUCTOR

[75] Inventors: John N. J. Andersson, Tullinge; Harry K. G. Karlen, Bromma; Lennart A. U. Ulfhielm, Stockholm, all of Sweden

[73] Assignee: Aktiebolaget Electrolux, Stockholm, Sweden

[21] Appl. No.: 760,417

[22] Filed: Jan. 19, 1977

[30] Foreign Application Priority Data

Jan. 26, 1976 [SE] Sweden ................................. 7600738

[51] Int. Cl.² .......................... A47L 9/24; F16L 11/12
[52] U.S. Cl. ....................... 174/47; 138/125; 138/129; 138/138
[58] Field of Search .................... 174/47; 340/320; 339/15, 16 R, 16 C, 16 RC; 138/103, 121–127, 129–134, 137–139

[56] References Cited

U.S. PATENT DOCUMENTS 3,780,208  12/1973  Whittaker et al. ..................... 174/47

FOREIGN PATENT DOCUMENTS 2256231  5/1974  Fed. Rep. of Germany ............. 174/47
2505144  8/1975  Fed. Rep. of Germany ........... 138/125
 889995  2/1962  United Kingdom ................... 138/121

*Primary Examiner*—Laramie E. Askin
*Attorney, Agent, or Firm*—Alfred E. Miller

[57] ABSTRACT

A vacuum cleaner hose having an electrical conductor for a motor driven work tool. The hose includes an inner and outer tube having a spacing therebetween which has been so chosen as to permit the electrical conductor therein to move relatively freely therebetween. The desirable result of the construction is that the vacuum cleaner hose is easier to handle and bend and at the same time the electrical conductor is carried within the hose and is not subject to the exposure of bare conductor wires due to wear.

6 Claims, 2 Drawing Figures

VACUUM CLEANER HOSE HAVING AN ELECTRICAL CONDUCTOR

BACKGROUND OF THE INVENTION

Vacuum cleaner hoses are known which provide one or more electrical conductors connected to an attachment for a vacuum cleaner, such as a motor driven work tool. This arrangement eliminates the necessity of a separate source of current for the work tool and therefore facilitates the operation of the work tool since no extra cables are in the way of the floor maintenance operation. It is thus apparent that the vacuum cleaner hose has a two-fold function, i.e., partly to convey dust laden air from the working tool to the dust container which is housed inside the vacuum cleaner, and partly to conduct electrical energy to the driving motor of the working tool by means of the electrical conductor thereon.

In many cases, the electrical conductor is placed directly on the hose and the hose is then provided with an outer layer covering the conductor. It is also known to place the conductor into a groove arranged in the hose. In the latter case, the conductor is either fixed in the groove or it is permitted to have a certain amount of axial movability in the groove. It will be apparent that in the first case where the conductor is fixed in the groove a rather rigid hose is obtained because during bending of such a hose the conductor is exposed to maximum stretching strain which makes the hose difficult to handle. Furthermore, such an arrangement causes an increased wear of the hose which after some time may result in hose damage or breakage. In the second example, when the conductor is loosely inserted in a groove forming a spiral in the hose structure, the conductor participates during the bending of the hose in the longitudinal direction of the hose wall. This arrangement results in the hose being easier to bend in the handle.

Another known arrangement with respect to electrical connectors and vacuum cleaner hoses is to shape a hose of two loose flexible tubes being an inner and outer tube with the electrical conductor arranged in a space between the tubes so the conductor is essentially parallel to the longitudinal axis of the hose. However, this particular arrangement has a drawback in that upon bending of the hose, the conductor will be exposed to the same stretching strain as if it were rigidly connected to said hose.

It is an object of the present invention to provide a vacuum cleaner hose carrying an electrical conductor which is light weight, easy to bend, and is relatively inexpensive to manufacture. In order to achieve the foregoing objectives the inner and outer vacuum cleaner hose tubes have selected diameters so that an electrical conductor can be positioned therebetween and is able to freely move in the space.

A further object of the present invention is to provide spaced means in the space between the outer and inner vacuum cleaner hose tubes which maintains the shape and orientation of the electrical conductor present in said space.

In order that the invention will be more clearly understood, it will be disclosed in greater detail with reference to the accompanying drawings, in which:

FIG. 1 is a perspective view of the vacuum cleaner hose with an electrical conductor, partly cut away, showing the principles of the invention; and FIG. 2 is a sectional view taken along the lines II—II of FIG. 1.

DESCRIPTION OF THE PREFERRED EMBODIMENT

Figure 1:
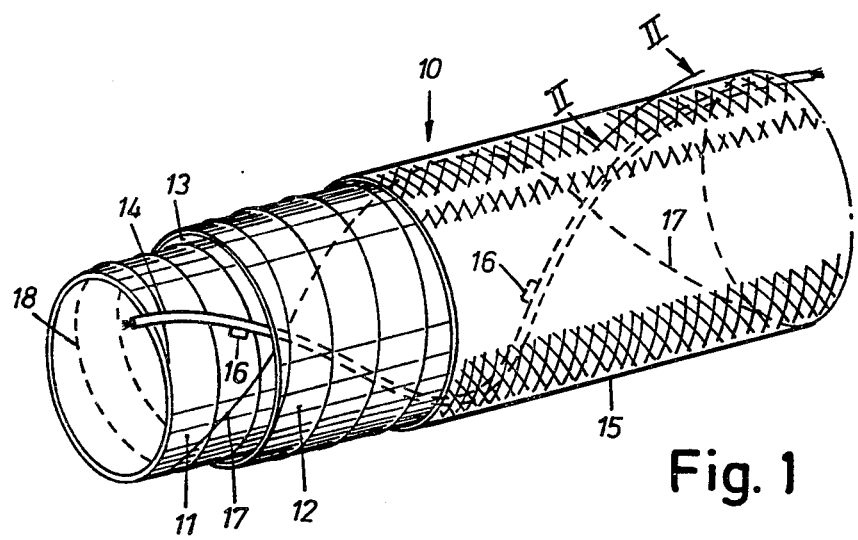
Figure 2:
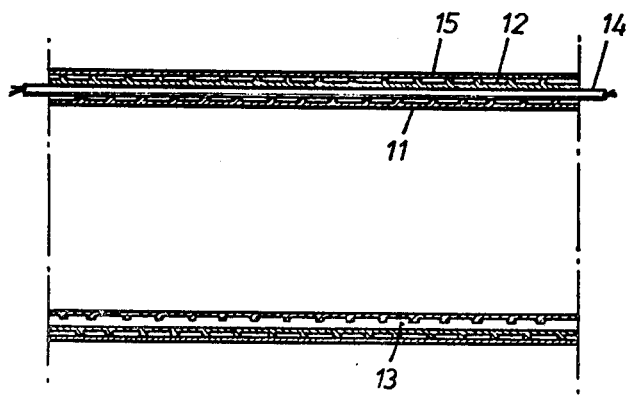

As seen in FIG. 1, the vacuum cleaner hose is designated by the numeral 10 and is composed of an inner tube 11 as well as an outer tube 12. The diameters of the tubes 11 and 12 are chosen so that a space 13 is formed between the tubes. An electrical conductor 14 is placed in the space 13. Thereby, the radial distance between the tubes 11 and 12 exceeds somewhat the thickness of the conductor 14 so that said conductor can move freely during the multi-direction bending of the hose. An outer sheath 15 preferably fabricated of braided material is arranged on the outer tube 12, and as is seen from FIG. 1, the electrical conductor 14 forms a spiral configuration in the space 13. This spiral can consist of either a single turn along the entire length of the hose, or of several spiral turns arranged along this length.

The circumstance that the electrical conductor is arranged in the space 13 between the tubes 11 and 12 in the shape of a spiral makes an essential difference from the hose known through the German publication No. 2,256,231, where the electrical conductor is essentially parallel with the longitudinal axis of the hose. It should be evident that during bending of the known hose, the electrical conductor is exposed to maximum stretching strain if it happens to be on the drawn side. This causes increased hose wear with possible hose damage as a consequence.

On the other hand, and due to a certain movability in the longitudinal direction of the hose, the electrical conductor in the arrangement, according to the present invention, is not exposed to any stretching forces, i.e., it does not participate in the bending of the hose, which results in a more flexible hose which is easier to handle.

Spaced means are provided so that the electrical conductor will maintain its shape in the space 13 between the tubes 11 and 12. The spaced means may take the shape of radial elevations 16, adapted on a part of the tube, as evident from FIG. 1, Alternatively, a spacing spring 17 is arranged in the space 13 concentrically with the spiral of the conductor. It is also conceivable that the insulation of the electrical conductor 14 is given such stiffness that the spiral by itself strives to maintain its original shape.

The tubes 11 and 12 are made of easily flexible material, for example, plastic. Moreover, at least one of the tubes 11 and 12 is fortified by means of a reinforcing thread 18 wound in the shape of a spiral having a low pitch in order to give the hose the desirable firmness.

It is not intended to limit the present invention to the device shown and described but it should be apparent that the various modifications thereof can be undertaken within the spirit and scope of the following claims.

What is claimed is:

1. A vacuum cleaner hose comprising an inner flexible tube and an outer flexible tube, at least one electrical conductor arranged in a space between said tubes in a spiral configuration, said inner and outer tubes having diameters that are so chosen that said electrical conductor freely moves both longitudinally and laterally in the space between said tubes, said electrical conductor thereby being not subject to stretching forces when said hose is bent out of a linear configuration, and said hose being provided with spacing means located in said space between said inner and outer tubes which engage said electrical conductor at selected locations for maintaining the spiral configuration of said electrical conductor.

2. A vacuum cleaner hose as claimed in claim 1 wherein said spiral forms a single turn along the entire length of said hose.

3. A vacuum cleaner hose as claimed in claim 1 wherein said spiral forms more than one turn along the entire length of said hose.

4. A vacuum cleaner hose as claimed in claim 1 wherein said spacing means are radial elevations projecting from either of said tubes.

5. A vacuum cleaner hose as claimed in claim 1 wherein said spacing means constitutes a spacing spring arranged in the space concentrically with said spiral configuration of said electrical conductor.

6. A vacuum cleaner hose as claimed in claim 1 wherein said tubes are flexible plastic, and at least one of said tubes is provided with reinforcing thread wound in the shape of a spiral and having a pitch which is considerably smaller than the pitch of said conductor having a spiral configuration.

* * * * *